United States Patent Office 3,258,072
Patented June 28, 1966

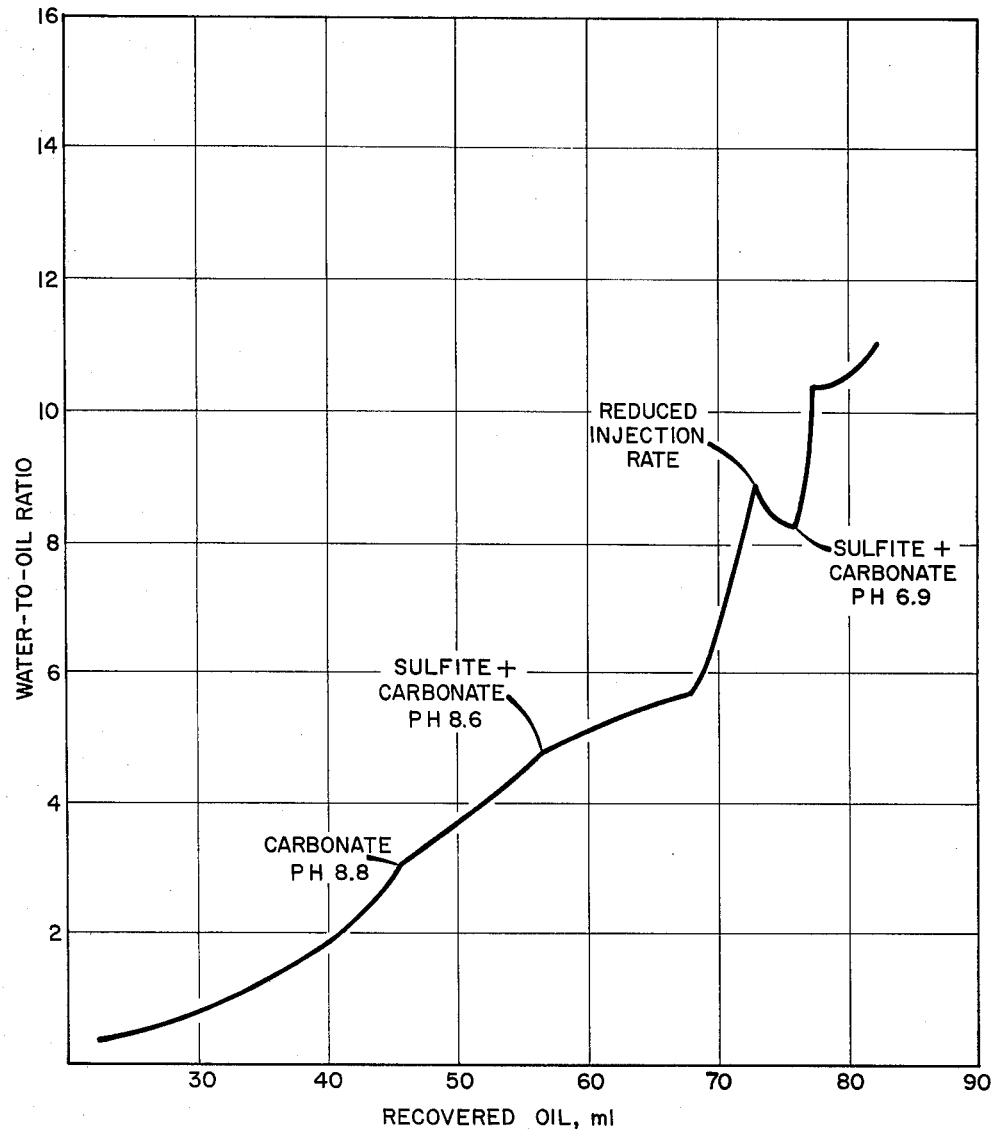

3,258,072
WATER FLOODING WITH SULFITE SOLUTIONS
H Robert Froning, Tulsa, Okla., assignor to Pan American Petroleum Corporation, Tulsa, Okla., a corporation of Delaware
Filed June 3, 1963, Ser. No. 284,902
15 Claims. (Cl. 166—9)

This invention relates to the recovery of oil from oil-bearing earth formations. More particularly, it relates to water flooding such formations.

In water flooding oil-bearing earth formations, water is injected down an input well and into the formation. The water displaces oil from the formation toward a producing well through which the oil is recovered. Many additives, such as sodium carbonate, sodium hydroxide, phosphates and the like, have been proposed for use in the water to improve oil recovery. Some of these worked well in specific formations. A characteristic of the operation of additives in flooding water, however, has been that, although certain additives might improve oil recovery from some reservoirs, these same additives did not improve recovery from other formations.

An object of my invention is to provide a new class of additives for use with flooding water to improve oil recovery together with means for determining in what formations and under what circumstances the additives are effective. Another object of the invention is to provide a method for recovering oil from a permeable solid material in which the solid material is contacted with water containing a class of additives in a concentration and at a pH capable of improving oil recovery from the solid material. Still further objects will be apparent from the following description and claims.

I have found that in some formations substantially neutral and alkaline sulfite salts of ammonium or the alkali metals in solutions about 0.1 to about 2.0 molar with respect to the salts, and preferably between about 0.2 and about 1.0 molar, will make the formations more water wet and will considerably increase oil recovery.

The drawing is a plot of the results of a flow test in which a combination of a sulfite and a carbonate was used to displace Empire Abo crude oil from an Abo Reef core.

Sulfites, like other additives, are not effective in all formations. It is important, therefore, that before the sulfites are used in a water flooding operation a test should be made which will give some assurance that the additive will improve recovery of the specific oil from the particular formation in question. The best test probably consists of obtaining a true native state core and using this in the test. As a practical matter, however, it is generally sufficient to limit the test to obtaining a core of the formation in question, cleaning the core, saturating the core with substantially air-free crude oil from the formation, flooding the core with the flooding water available, and then flooding the core with the same water containing the sulfite salt. If additional oil recovery is obtained with the sulfite-containing solution, the solution would be shown to be potentially usable in the flooding operation.

Sometimes cores of the formation cannot be obtained. In such cases I have found a good test to be one involving measurement of the wettability of surfaces as similar as possible to those known to be present in the formation. Ordinarily these surfaces will be quartz, calcite, dolomite or silicates such as clays. Crystals of quartz, calcite and dolomite can be obtained and polished to provide smooth surfaces on which the measurement can be made. Since it is more difficult to obtain large dolomite crystals, it is customary to use calcite crystals to evaluate agents for use in dolomite reservoirs. A clay surface can be provided by wetting a polished surface of one of the crystals with an aqueous suspension of the clay, draining off excess suspension and allowing the surface to dry.

When the surface is prepared, it should be covered by water. Preferably, the water should be that present in the formation. If this water is not available, a satisfactory substitute is water which has been in contact with the oil for a period of several days so materials soluble in both the oil and water have reached substantial equilibrium between the two phases. A drop of air-free crude oil from the formation is then placed on the crystal surface. The crude oil should be maintained air free to avoid partial oxidation of the crude which may form surface-active agents not actually present in the crude oil and which might therefore produce misleading results.

The contact angle of the oil-water interface with the testing surface is measured repeatedly over a period of time long enough, usually many days, to insure that the contact angle has approached an equilibrium value. Contact angle measurements are usually made under conditions so that the water is caused to advance across the surface previously wet by oil. This is to accelerate reaching equilibrium. A more detailed description of such techniques is to be found in U.S. Patent 3,028,912. The water phase is then replaced by the proposed flooding water containing the sulfite salt and the water-advancing contact angles are measured over a period of time. The contact angle using the sulfite-containing water is then compared to the contact angle using the natural or simulated formation water.

If the water wettability is increased in the presence of the sulfite-containing water, then this solution is potentially useable in the waterflooding operation. An increased water wettability is indicated by a decrease in the contact angle as measured from the water side.

Best results are ordinarily obtained when the formation is originally preferentially oil wettable (contact angle over 90 degrees) and the sulfite solution makes the formation preferentially water wettable (contact angle less than 90 degrees). Some benefits have been obtained, however, by simply increasing water wettability (decreasing the contact angle) although wettability reversal does not take place.

My invention will be better understood from the results of tests using air-free crude oil from the Empire Abo Field in New Mexico. The oil was from the Abo Reef. Calcite crystals were used to provide the surfaces for contact angle measurements. A drop of the oil was placed between two crystal surfaces in contact with water which had been brought to equilibrium with the air-free crude oil. One quartz crystal was moved relative to the other so the surfaces in contact with the oil drop moved parallel to each other. This formed two contact angles where the water advanced and two where the oil advanced. Both water-advancing contact angles were measured until they reached substantially equilibrium values. The water phase was then replaced with a prospective flooding water about 0.61 molar with ammonium sulfite, about 0.36 molar with ammonium carbonate, and having a pH of about 8.7. The crystals were moved again and the water-advancing contact angles were again measured.

The original water-advancing contact angles were 105 and 119 degrees. With the sulfite-containing water, the angles dropped to 80 and 65. It will be apparent that the sulfite is capable of reducing the contact angle and thus increasing the water wettability of this formation and thus increase oil recovery.

In order to demonstrate the applicability of the contact angle measurements as an indication of increased oil recovery in reservoir systems, a flow test was made. This test employed a heterogeneous-porosity limestone core from the oil-bearing portion of the Abo Reef. Equilibrium between the core and crude oil from the same reef was insured by circulating the oil through the core for several months before the flow test.

The core was flooded first with a brine similar to that found in the Abo Reef until breakthrough of water occurred and the water-to-oil ratio reached a value of about 3 to 1. This is believed to simulate field conditions where the flooding water displaces the formation brine ahead of the flooding water. As a result, the oil-bearing formation is flooded first by a bank of formation brine. A solution 0.36 molar with ammonium carbonate, but containing no sulfites, was then injected. The reason for this step in the flooding process was that it has been known for many years that carbonates in flooding water increase oil recovery from some formations, but not from others. It was desired to use carbonates with the sulfites in the test because this is one of the most economical ways for out indicating that the more nearly neutral solution was even more effective than the solution at higher pH. Unfortunately, no contact angle measurements for a sulfite-carbonate solution at this low pH are available for comparison.

From the flow test it will be apparent that the solution of sulfite and carbonate will displace more oil than carbonate alone before a prohibitively high water-to-oil ratio is reached. This confirms the predictions of the contact angle measurements.

Contact angle tests with hydrochloric acid and with sodium hydroxide showed that these materials were ineffective in changing the contact angle of Empire Abo crude oil in contact with calcite.

Contact angle results using sulfites and other crude oils sometimes in contact with calcite and sometimes with quartz are presented in the following table.

| Reservoir | Surface | Original Angle | Chemical Solution | | | Angle Change |
|---|---|---|---|---|---|---|
| | | | Material | Molarity | pH | |
| Slaughter (San Andres) | Calcite | 120 | $(NH_4)_2SO_3$ | 0.2 | 8.0 | None. |
| Do | do | | $(NH_4)_2SO_3$ | 0.5 | 8.1 | Reversed. |
| Fullerton (San Andres) | do | 140 | $Na_2SO_3$ + $Na_2CO_3$ | | 11.0 | Increased. |
| Do | do | 140 | $Na_2SO_3$ | 0.5 | 7.6 | Decreased. |
| Do | do | 140 | $Na_2SO_3$ | 0.5 | 9.9 | Do. |
| Do | do | 140 | $Na_2SO_3$ | 0.5 | 6.5 | Reversed. |
| Swan Hills (Slave Point) | do | 140 | $Na_2SO_3$ | 0.5 | 9.7 | Decreased. |
| Do | do | 140 | $Na_2SO_3$ | 0.5 | 5.3 | Increased. |
| Do | do | 140 | $Na_2SO_3$ + $Na_2CO_3$ | 0.5 0.4 | 11.2 | None. |
| Cha Cha Gallup (Gallup) | Quartz | 115 | $Na_2SO_3$ | 0.5 | 4.5 to 10 | None. |
| Little Buffalo Basin (Tensleep) | do | 130 | $Na_2SO_3$ | 0.5 | 10 | Do. |
| Do | do | 130 | $Na_2SO_3$ | 1.0 | 4.0 | Reversed. |
| Salt Creek (First Wall Creek) | do | 150 | $H_2SO_3$ | 0.3 | 1.0 | Do. |
| Salt Creek (Tensleep) | do | 150 | $Na_2SO_3$ | 0.5 | 4 to 10 | None. | the use of sulfites in the field, and because the contact angles which were available were determined with this mixture. In addition, it was known that carbonates alone were capable of decreasing the contact angle of Abo Reef brine and oil in contact with calcite, even though the carbonate alone did not reverse the wettability. It seemed important, therefore, to check the effects of the carbonate alone to provide a basis for comparison to the effects of the mixture of carbonates and sulfites.

In the drawing it will be noted that the rate of increase of the water-to-oil ratio became smaller as soon as the carbonate solution was introduced. This confirmed the effects indicated by contact angle observations. When the solution containing both the sulfite and carbonate was introduced, the rate of increase of the water-to-oil ratio in contrast to the normal accelerated rise became even smaller while an additional amount of oil was produced. This again confirmed the effects indicated by the contact angle measurements which showed the wettability-reversing ability of the sulfite-carbonate solution. Eventually, in the core flow test the rate of increase of water-to-oil ratio returned to a value of approximately what would be expected in a flooding operation.

With the introduction of the solution of sulfite and carbonate, the pressure drop across the core began to increase. This is a characteristic of reversing the wettability of a core during a flooding operation. The pressure drop became excessive so the flow rate was decreased. A sharp drop in the water-to-oil ratio resulted. The reason for this is not completely understood. It is known that sulfites sometimes act rather slowly in reversing the wettability of surfaces. Therefore, the decrease in water-to-oil ratio upon decreasing the flow rate may have been due to more time being allowed for the reversal to take place.

Finally, a solution containing both sulfite and carbonate at a lower pH was injected into the core. After this change there was an initial increase in the water-to-oil ratio. This was probably simply the end of the temporary effects of reducing the rate of flow. After the initial increase, the rate of increase in the ratio again flattened The results shown in the table indicate that the wettability of the San Andres lime can be reversed in both the Slaughter and Fullerton Fields. It is apparent, however, that the concentration and pH must be carefully selected. In the case of the Slave Point reservoir of the Swan Hills Field, the contact angle was decreased, but the wettability was not reversed.

Sulfite seemed ineffective with oil from the Gallup reservoir of the Cha Cha Gallup Field in contact with quartz. While the sulfites reversed the wettability of quartz in contact with oil from both the Tensleep formation of the Little Buffalo Basin Field and the First Wall Creek formation of the Salt Creek Field, the pH was very low. If a formation contains much calcium carbonate, as many do, it will not, of course, be possible to maintain such a low pH. For this reason it is generally advisable to use a sulfite solution having a pH of at least about 6 and preferably between about 7 and about 10. In a higher pH range sulfites were not able to change the wettability of quartz in contact with crude oil from the Tensleep formation in another field. This was the Tensleep of the Salt Creek Field. There was substantially no effect even at a pH as low as 4. Possibly, the higher concentration of sulfite, used with the oil from the Little Buffalo Basin Tensleep, would also have been effective with the oil from the Salt Creek Tensleep. The tests serve to illustrate the almost complete unpredictability of the action of sulfite in the presence of various crude oils. Further evidence of unpredictability is to be found in my U.S. patent aplication S.N. 266,078 filed March 18, 1963, now U.S. Patent 3,203,480.

In view of the uncertainty regarding the most effective pH of the solution and the best concentration to use, contact angles should be measured using various concentrations of alkali metal sulfites or ammonium sulfites at various levels of pH. The solution providing the greatest increase in water wettability at a pH above about 6 can then be used in the flooding operation. Economic considerations may, of course, indicate use of a somewhat less effective solution.

It may be desirable, when possible, to confirm the contact angle indications with a flow test similar to the one described above. In this confirming flow test a core from the formation to be flooded can be saturated and aged with air-free oil from the formation. The core is then flooded, preferably to a water-to-oil ratio of about 10 to 1, with a water as similar as possible to the water which will immediately precede the sulfite-containing water. The core is then cooded with the sulfite solution. If the water-to-oil ratio decreases, or even if the ratio of increase of water-to-oil ratio becomes less with the sulfite solution, it will be apparent that more oil can be recovered by flooding with the sulfite solution.

The chemical additive to flooding water may work well in the laboratory and still be ineffective in field use if the chemical is strongly adsorbed on the formation. The reason is that the flow paths in the laboratory short, while those in the field may be several hundred feet long. For this reason a flow test was made in which a sulfite solution was carefully analyzed for sulfite content before and after flowing through a tube packed with limestone. The limestone was crushed to pass a Number 20 U.S. Standard Sieve and be retained on a Number 50 sieve. Before exposure to the limestone, the solution was 0.63 molar with sodium sulfite, and 0.36 molar with sodium carbonate. A slug of this solution equal to 6 percent of the pore volume of the packed tube was forced through the pack with water. The total amount of sulfite introduced into the limestone was about 19.1 millimoles. The amount out was about 15.1 millimoles. The weight of limestone was about 1889 grams. Thus, the loss of sulfite amounted to about 0.21 millimole per 100 grams of limestone.

This rate of loss is enough to be considered serious in a flooding operation, but is less than the loss of other chemicals, such as phosphates, under some conditions at least. The loss rate emphasizes the importance of a source of inexpensive sulfites. In or near many oil fields are natural gasoline plants, and the like, where hydrogen sulfide and carbon dioxide are removed from natural gas and gasoline. The hydrogen sulfide is usually burned before release to the atmosphere. The resulting mixture of sulfur dioxide and carbon dioxide can be reacted with sodium hydroxide, ammonium hydroxide, or the like, to provide the desired alkali metal or ammonium sulfite and carbonate salts.

Many variations are possible in this absorption process. If the absorbing liquid is a sodium hydroxide solution, the gas may be simply introduced through a perforated tube in the bottom of a small tank filled with hydroxide. A packed absorption column or an absorption column with plates and bubble caps may be used if desired. In this case the gas will usually be introduced into the bottom of the column, the absorbing solution being introduced into the top.

If the ammonium salts are to be prepared, it may be advisable to inject a small stream of ammonia into the gas stream before the gas enters the absorption chamber, or at a level considerably below the top of the absorber. Water is introduced into the top of the absorber to dissolve the ammonium salts and carry them out the bottom of the absorber. This technique has the advantage of avoiding loss of the volatile ammonia.

As shown in the tests, carbonates may accompany the sulfite if desired. This is convenient since introducing carbon dioxide is a good way to adjust the pH. It is usually preferred that an amount of carbonate approximately equal, or a molar basis, to the concentration of sulfites should be used. This is not only because the carbonates act as buffers to control the pH of the solution, but also because the carbonates, particularly ammonium carbonates, sometimes aid in increasing the water wettability of the formation. The carbonate may precede, accompany or follow the sulfite, but it is preferred, ordinarily, that the carbonate and sulfite solution be injected simultaneously in a single solution. The carbonates should be ammonium or alkali metal salts so as to be compatible with the ammonium and alkali metal sulfites.

Although some carbonates may be desirable, some gases available in the oil field contain much more carbon dioxide than hydrogen sulfide. When these are burned, the concentration of carbon dioxide may greatly exceed the sulfur dioxide content. This may also be true if the original gases contain hydrocarbons, which are also burned, and thus form additional carbon dioxide. In the absorption process, it may be desirable to limit the absorption of carbon dioxide in order to reduce the cost of the neutralizing base. I have found that the absorption of carbon dioxide can be substantially avoided by controlling the process to provide a final pH below about 5 in the solution. In a batch process it is only necessary to pass gas through the solution until the pH drops to the desired value. In a continuous process, the gas feed rate or the feed rate of the basic absorbing solution can be controlled to provide the desired pH below about 5 in the sulfide solution in the bottom of the absorption chamber.

If desired, some of the carbon dioxide can be absorbed in a second stage; the resulting carbonate salt solution being then mixed with the sulfite salt solution in the required ratio. Both the sulfur dioxide and a limited amount of the carbon dioxide may be absorbed in the same absorber if desired. If the gas composition or flow rate is variable, however, control of such a process may be somewhat difficult. The two-stage process is generally simpler to control and is, therefore, preferred.

Salts other than carbonates may also be present provided that they do not substantially adversely affect the wettability-changing effect of the sulfites. For example, thiosulfates or thionates, which may be formed have not been found to have adverse effects. If, upon testing, it is found that adversely-acting chemical is present in water within the formation, it will be desirable to inject into the formation ahead of the sulfite solution a batch or slug of water compatible with the sulfite solution.

When reference is made herein to a sulfite it will be understood that this may be a single salt or a mixture of two or more ammonium and alkali metal salts including sulfites and bisulfites. Likewise, a carbonate may be a single salt or mixture of salts.

When flow tests are made in the laboratory to determine if increased oil recovery can be expected by use of a sulfite solution, the water which is first forced through the core should be as similar as possible to that which will immediately precede the sulfite solution in the flooding operation. This may be the naturally occuring water in the formation, a synthetic formation water, a batch of water injected to protect the sulfite solution, or flooding water which has already been in use for some time before the sulfite solution is injected. If a sample of the water which will immediately precede the sulfite solution is not available, then a solution should be used having a composition as similar as possible to this water.

If an ammonium sulfite is used, and if the formation contains considerable clay, loss of the ammonium ion may occur due to exchange with sodium ion in the clay. This may adversely affect the pH of the solution. Particularly where control of pH is important, therefore, it is usually advisable to maintain some sodium chloride in the ammonum sulfite solution to reduce ion exchange and thus control pH.

Certain variations and techniques are possible within the scope of my process. For example, if a formation has originally been flooded with water, the oil phase may have become at least partailly discontinuous. That is, the remaining oil may exist as isolated droplets in the pores or as spots on the formation surface. To reestablish good oil continuity and thus permit better flow of oil through the formation as the sulfite solution advances, it may be advisable to inject what is sometimes called a bank or batch or slug of oil ahead of the sulfite solution. The bank of oil may also follow the sulfite solution and precede the ordinary flood water to displace the sulfite solution through the formation.

The size of the oil bank may be as little as 1 or 2 percent of the pore volume of the portion of the reservoir expected to be flooded. The oil bank should grow in volume as it picks up oil left behind by the previous flooding operation so injection of a large bank is not required.

Whether an oil bank is used or not, the volume of the sulfite solution should also ordinarily be at least about 1 percent of the pore volume expected to be flooded. Preferably, the sulfite solution should be from about 2 to 20 percent of the flooded pore volume. A compromise is often necessary between a high concentration and a large volume of solution to keep the process within economic limits.

While the process is most useful in water flooding operations, it will be apparent that it is also useful for other purposes. For example, the process can be used for the more effective removal of oil from cores, packed columns, or other permeable materials in the laboratory.

The above descriptions and variations are given by way of example. Many additional variations falling within the scope of the following claims will occur to those skilled in the art.

I claim:

1. A process for water flooding an oil-bearing formation penetrated by at least one injection well and at least one producing well comprising introducing into said formation, through said injection well, an aqueous solution having a pH of at least about 6 and containing a sulfite salt selected from the group consisting of ammonium sulfites and alkali metal sulfites in a concentration at least about 0.1 molar with respect to said sulfite salt, the volume of said aqueous solution being at least about 1 percent of the pore volume expected to be flooded, and producing oil from said at least one producing well.

2. The process of claim 1 in which said solution contains, in addition to said sulfite salt, a carbonate salt selected from the group consisting of ammonium carbonates and alkali metal carbonates.

3. A process for water flooding an oil-bearing formation penetarted by at least one injection well and at least one producing well comprising introducing into said formation, through said injection well, an aqueous solution having a pH between about 7 and about 10 and containing a sulfite salt selected from the group consisting of ammonium sulfites and alkali metal sulfites in a concentration between about 0.2 and 1.0 molar with respect to said sulfite salt, the volume of said aqueous solution being between about 2 and about 20 percent of the pore volume expected to be flooded, and producing oil from said at least one producing well.

4. A process for water flooding an oil-bearing formation penetrated by at least one injection well and at least one producing well comprising introducing into said formation, through said injection well, an aqueous solution of sulfite salt selected from the group consisting of ammonium sulfites and alkali metal sulfites, the concentration of said sulfite salt being at least about 0.1 molar and the pH of said solution being at least about 6, and said concentration and pH being sufficient to make said formation more water wettable than it is when in contact with the naturally occurring oil and water in said formation, the volume of said aqueous solution being at least about 1 percent of the pore volume expected to be flooded, and recovering oil from said at least one producing well.

5. The process of claim 4 in which said solution contains, in addition to said sulfite salt, a carbonate salt selected from the group consisting of ammonium carbonates and alkali metal carbonates.

6. An improved method for recovering oil from an oil-bearing permeable solid material characterized by being an oil-bearing earth formation comprising introducing into said material, through an input means, an aqueous solution having a pH of at least about 6 and containing a sulfite salt selected from the group consisting of ammonium sulfites and alkali metal sulfites in a concentration at least about 0.1 molar with respect to said sulfite salt, the volume of said aqueous solution being at least about 1 percent of the pore volume of said solid material to be flooded, and withdrawing oil from said material through an output means.

7. The process of claim 6 in which said solution contains, in addition to said sulfite salt, a carbonate salt selected from the group consisting of ammonium carbonates and alkali metal carbonates.

8. An improved method for recovering oil from an oil-bearing permeable solid material characterized by being an oil-bearing earth formation comprising introducing into said material, through an input means, an aqueous solution having a pH between about 7 and about 10 and containing a sulfite salt selected from the group consisting of ammonium sulfites and alkali metal sulfites in a concentration between about 0.2 and about 1.0 molar with respect to said sulfite salt, the volume of said aqueous solution being between about 2 and about 20 percent of the pore volume of said solid material to be flooded, and withdrawing oil from said material thorugh an output means.

9. A process for water flooding the Abo Reef formation of the Empire Abo Field in New Mexico and equivalents thereof, comprising introducing into such formation, through an injection well, an aqueous solution having a pH betwen about 7 and about 10 and containing a sulfite salt selected from the group consisting of ammonium sulfites and alkali metal sulfites in a concentration between about 0.2 and about 1.0 molar with respect to said sulfite salt, the volume of said aqueous solution being between about 2 and about 20 percent of the pore volume expected to be flooded, and producing oil from at least one producing well penetrating said formation.

10. The process of claim 9 in which said solution contains, in addition to said sulfite salt, a carbonate salt selected from the group consisting of ammonium carbonates and alkali metal carbonates.

11. A process for water flooding an oil-bearing formation penetrated by at least one injection well and at least one producing well comprising obtaining an air-free sample of oil from said formation, placing said oil in contact with a smooth, solid surface having a composition substantially the same as that of the surface exposed to the oil and water within said formation, placing in contact with said oil and said solid surface a first water solution at least similar to that present in said formation, determining a first equilibrium contact angle of the oil-water interface with said solid surface, replacing said first water solution with a second water solution containing a sulfite selected from the group consisting of ammonium sulfite and alkali metal sulfites, determining a second equilibrium contact angle of the oil-water interface with said solid surface, the sulfite concentartion of said second solution being at least about 0.1 molar and the pH being at least about 6, introducing into said formation, through said injection well, an aqueous solution having substantially the composition of said second water solution, when the equilibrium contact angles indicate said second water solution makes said formation more water wettable than said first water solution, the volume of said aqueous solution introduced into said formation being at least about 1 percent of the pore volume expected to be flooded, and producing oil from said at least one producing well.

12. The process of claim 11 in which said second solution contains, in addition to said sulfite salt, a carbonate salt selected from the group consisting of ammonium carbonates and alkali metal carbonates.

13. A process for water flooding an oil-bearing formation penetrated by at least one injection well and at least one producing well comprising introducing down said at least one injection well and into said formation an aqueous solution of a sulfite salt selected from the group consisting of ammonium sulfites and alkali metal sulfites, the volume of said aqueous solution being at least about 1 percent of the pore volume expected to be flooded, the concentration of said sulfite salt being at least about 0.1 molar and the pH of said solution being at least about 6, and said concentration and pH being sufficient to cause said solution to provide an increased oil recovery from said formation, as determined by a flooding test in a core from said formation said core containing air-free oil from said formation, said core being flooded first to a water-to-oil ratio of about 10 to 1 with water as similar as possible to the water which will immediately precede said aqueous solution in the formation, and said core then being flooded by said aqueous solution, and producing oil from said at least one producing well.

14. The process of claim 13 in which said solution contains, in addition to said sulfite salt, a carbonate salt selected from the group consisting of ammonium carbonates and alkali metal carbonates.

15. A process for water flooding an oil-bearing formation penetrated by at least one injection well and at least one producing well comprising obtaining an air-free sample of oil from said formation, placing said oil in contact with a smooth, solid surface having a composition substantially the same as that of the surface exposed to the oil and water within said formation, placing in contact with said oil and said solid surface a first water solution at least similar to that present in said formation, determining a first equilibrium contact angle of the oil-water interface with said solid surface, replacing said first water solution with other water solutions containing various concentrations of a sulfite selected from the group consisting of ammonium sulfites and alkali metal sulfites, at various levels of pH, in each case determining the equilibrium contact angle of the oil-water interface with said solid surface, selecting a preferred solution having a sulfite concentration of at least about 0.1 molar and a pH of at least about 6 and capable of making said formation more water wettable than said first solution, preparing said preferred solution from a gas containing both sulfur dioxide and carbon dioxide by introducing said gas near the bottom of an absorption chamber, introducing near the top of said absorption chamber a water solution of a hydroxide selected from the group consisting of ammonium hydroxide and alkali metal hydroxide, the concentration of said hydroxide being sufficient to provide the desired concentration of sulfite salt when reacted with sulfur dioxide, controlling the rates of introduction of said gas and said hydroxide to establish in the bottom of said absorption chamber a sulfite salt solution having a pH below about 5, whereby reaction of the solution with carbon dioxide is decreased, withdrawing sulfite solution from the bottom of said absorption chamber, adjusting the pH of the withdrawn solution to form said preferred solution, introducing said preferred solution into said formation through said injection well, the volume of said preferred solution being at least about 1 percent of the pore volume expected to be flooded, and producing oil from said at least one producing well.

References Cited by the Examiner

UNITED STATES PATENTS

| | | | |
|---|---|---|---|
| 2,223,933 | 12/1940 | Garrison | 252—8.55 |
| 2,581,752 | 1/1952 | Collier | 23—129 |
| 2,787,326 | 4/1957 | Hughes | 166—42 |
| 2,796,325 | 6/1957 | Bertozzi et al. | 23—129 |
| 3,100,524 | 8/1963 | Beeson | 166—9 |
| 3,116,791 | 1/1964 | Sandiford et al. | 166—9 |
| 3,119,447 | 1/1964 | Raifsnider et al. | 166—1 |

JACOB L. NACKENOFF, *Primary Examiner.*

CHARLES E. O'CONNELL, *Examiner.*

T. A. ZALENSKI, *Assistant Examiner.*